(12) United States Patent
Motts et al.

(10) Patent No.: US 9,120,424 B2
(45) Date of Patent: Sep. 1, 2015

(54) TRAILER SIGNAL CONVERTER

(71) Applicant: CEQUENT PERFORMANCE PRODUCTS, INC., Plymouth, MI (US)

(72) Inventors: Douglas Motts, Fort Wayne, IN (US); Larry Eccleston, North Battle Creek, MI (US); Chandrakumar D. Kulkarni, Battle Creek, MI (US)

(73) Assignee: Cequent Performance Products, Inc., Plymouth, MI (US)

( * ) Notice: Subject to any disclaimer, the term of this patent is extended or adjusted under 35 U.S.C. 154(b) by 0 days.

(21) Appl. No.: 14/195,424

(22) Filed: Mar. 3, 2014

(65) Prior Publication Data

US 2014/0246974 A1  Sep. 4, 2014

Related U.S. Application Data

(60) Provisional application No. 61/771,616, filed on Mar. 1, 2013.

(51) Int. Cl.
*B60Q 1/14* (2006.01)
*B60Q 1/30* (2006.01)

(52) U.S. Cl.
CPC ...................... *B60Q 1/305* (2013.01)

(58) Field of Classification Search
USPC ........................ 315/76, 77, 80; 307/10.1, 10.8
See application file for complete search history.

(56) References Cited

U.S. PATENT DOCUMENTS

| | | | | |
|---|---|---|---|---|
| 3,970,860 | A * | 7/1976 | Purdy | 340/477 |
| 4,751,431 | A * | 6/1988 | Ducote | 315/77 |
| 5,389,823 | A * | 2/1995 | Hopkins et al. | 307/10.1 |
| 5,615,930 | A | 4/1997 | McGrath et al. | |
| 5,760,545 | A * | 6/1998 | Mikel | 315/77 |
| 6,087,777 | A | 7/2000 | Long | |
| 6,545,600 | B1 * | 4/2003 | Boner | 340/468 |
| 8,179,142 | B2 | 5/2012 | Kulkarni et al. | |
| 2010/0152989 | A1 | 6/2010 | Smith et al. | |

OTHER PUBLICATIONS

International Search Report and the Written Opinion of the International Searching Authority, PCT/US2014/019948, Aug. 15, 2014.

* cited by examiner

*Primary Examiner* — Thuy Vinh Tran
(74) *Attorney, Agent, or Firm* — McDonald Hopkins LLC

(57) ABSTRACT

A trailer signal converter includes a plurality of inputs, including a first towing vehicle turn light signal, a second towing vehicle turn light signal, and a trailer brake signal. The trailer brake signal is a pulse-width modulated signal. The trailer signal converter selectively drives the turn and stop light signals on the trailer based on the input signals. In a three-wire system, the signal converter is configured to receive a brake signal input and a brake light input and selectively drive the trailer stop light signals.

17 Claims, 3 Drawing Sheets

TRAILER SIGNAL CONVERTER

CROSS-REFERENCE TO RELATED APPLICATIONS

This application claims priority to U.S. Provisional Patent Application No. 61/771,616 entitled "TRAILER SIGNAL CONVERTER," filed on Mar. 1, 2013, which is hereby incorporated by reference in its entirety.

FIELD OF THE INVENTION

The present invention relates generally to a signal converter and, more particularly, to an improved trailer signal converter for interfacing with a towing vehicle

BACKGROUND OF THE INVENTION

Towed vehicles, such as trailers, have brake signals that operate based on the braking signals of the towing vehicle. As is well known in the art, the braking signals of the towing vehicle are electrically connected to the braking system of the towed vehicle, such as via an electrical adapter, or the like. Typically, the signaling system of the towing vehicle has a signal lamp and a brake lamp that are operated by at least two separate filaments. However, most trailer signal systems usually combine the turn and brake signals into a single lamp with a single filament. Accordingly, an adapter or circuitry is often required in order to interface the signal system of the towing vehicle with the signal system of the towed vehicle or trailer.

Older model towing vehicles, such as pickup trucks, typically use a switch on the brake pedal to activate the brake lights. The switch is configured to send a signal, such as a 12 volt signal, to the vehicle's braking system or light controls. A towed vehicle may interface with the light signals of the towing vehicle, either directly or through a converter, to provide signals to the lights of the towed vehicle.

Trailer brake controllers are sometimes after-market devices that are designed to interface with the braking system of a towing vehicle and provide braking signals and light signals to a towed vehicle. Such trailer brake controllers commonly include a manual control to apply the brakes of the towed vehicle. When such action is taken, the lights of the towed vehicle must be activated. To activate the lights, trailer brake controllers are often configured to apply a voltage to the signal wire of the brake pedal switch. As described above, this signal activates the towing vehicle brake lights which in turn activates the towed vehicle brake lights. The towed vehicle brake lights are commonly the turn-signal lights activated together.

Newer model towing vehicles have replaced the brake pedal switch with a pedal position sensor. The pedal position sensor does not use the same 12 volt signal that was previously used with the pedal switch, but instead uses a signal that lacks the low impedance and voltage to drive the stop lamp input of the trailer brake controller. The sensor signal is then used as an input into a controller on the towing vehicle. This new design poses a problem for brake controllers, in that they are no longer able to receive the stop lamp signal when the towing vehicle brakes are applied.

In addition, on older model vehicles, the 12 volt signal from the pedal was able to be used to drive the brake lights on the towing vehicle directly, and therefore was able to also drive the trailer lights through a relay output. However, on newer model vehicles the pedal position sensor does not provide an adequate output to drive the lights and is not readily accessible. This new design poses a problem for brake controllers, in that they are no longer able to communicate the appropriate signal when the manual brake controls are applied.

Some towing vehicle manufacturers have provided an alternate access point to the stop lamp input signal. However, this output may not have the low impedance required to drive the stop lamp input of the brake controller. In addition, the alternate access point does not provide any means for the brake controller to drive the towing or towed vehicle brake lights.

In certain jurisdictions, alternative wiring and lighting systems are used to signal trailer braking. For example, in some countries, the trailer vehicle brake lights include both an amber light to indicate a turn signal and a red light to indicate a stop signal. Therefore, it is further required that a converter must be capable of outputting signals to drive both the turn signal light and the stop signal light on each side of the trailer.

Therefore, an improved solution is needed.

SUMMARY

A trailer signal converter is generally provided. The signal converter includes a plurality of inputs, including a first towing vehicle turn light signal, a second towing vehicle turn light signal, and a trailer brake signal. The trailer signal converter further includes one or more output signals to the trailer vehicle.

In an embodiment, the trailer signal converter is configured to interface with a two-wire system on the trailer. The output signals may include a first trailer vehicle turn light signal output and a second trailer vehicle turn light signal output. The trailer signal converter may be configured to turn on both the first and second trailer vehicle turn lights when both the first and second towing vehicle turn light signals are on and the trailer brake signal is off, or when the trailer brake signal is on and both the first and second towing vehicle turn light signals are off. Further, the trailer signal converter may be configured to flash the first trailer vehicle turn light and turn on the second trailer vehicle turn light when the trailer brake signal is on and the first towing vehicle turn light signal is flashing and the second towing vehicle turn light signal is off.

In an embodiment, the trailer signal converter is configured to interface with a three-wire system on the trailer. The output signals may include a first stop light output and a second stop light output. The first and second stop light outputs may turn on anytime the brake control signal from the brake controller is on.

DESCRIPTION OF THE DRAWINGS

Operation of the invention may be better understood by reference to the following detailed description taken in connection with the following illustrations, wherein.

The invention has been described above and, obviously, modifications and alterations will occur to others upon a reading and understanding of this specification. The claims as follows are intended to include all modifications and alterations insofar as they come within the scope of the claims or the equivalent thereof.

DETAILED DESCRIPTION

While the invention is described herein with reference to several embodiments, it should be clear that the invention should not be limited only to the embodiments disclosed or discussed. The description of the embodiments herein is illustrative of the invention and should not limit the scope of the invention as described or claimed.

Figure 1:
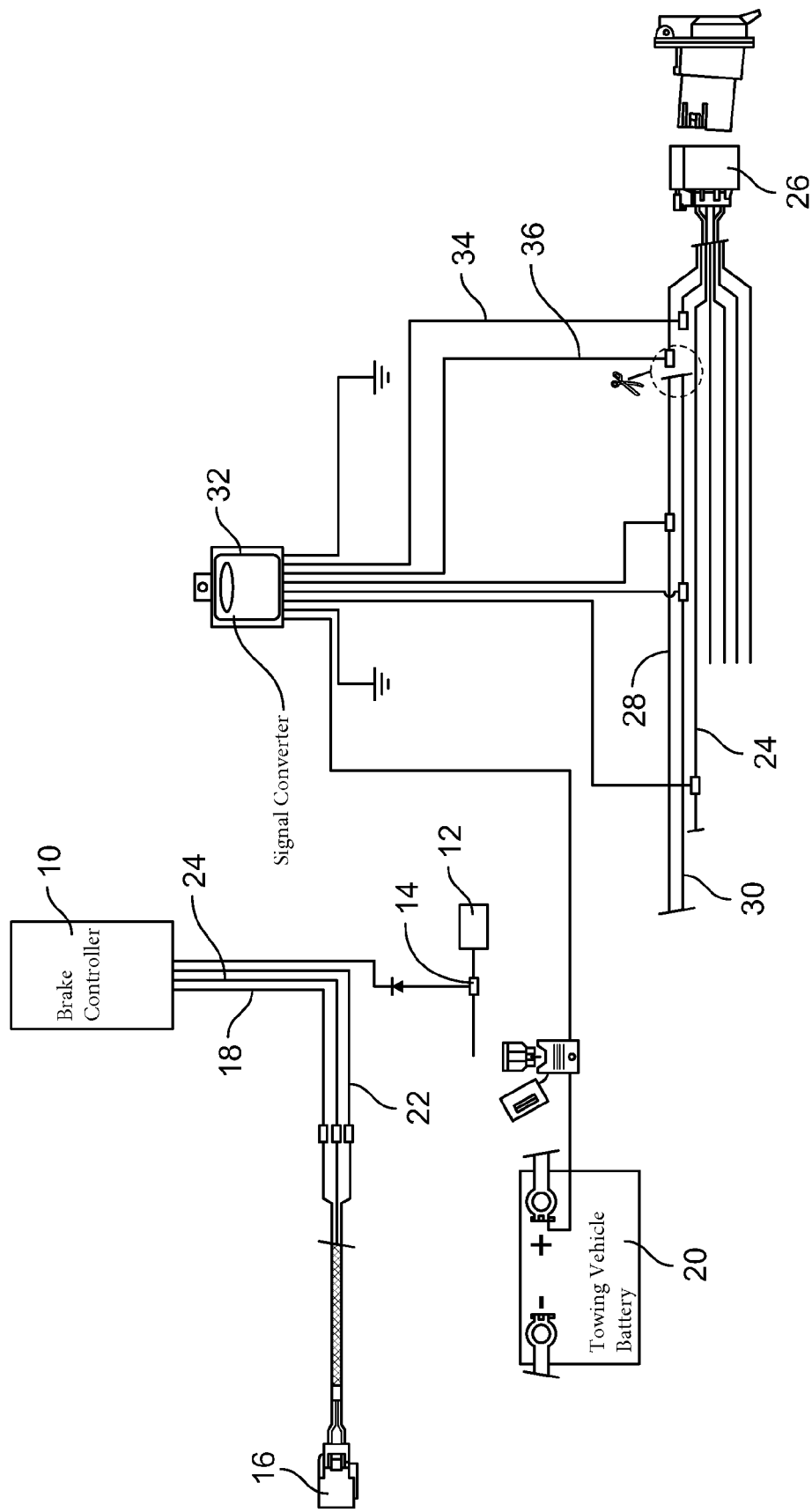
FIG. 1 illustrates a component diagram of a trailer brake and light signal system.
Figure 2:
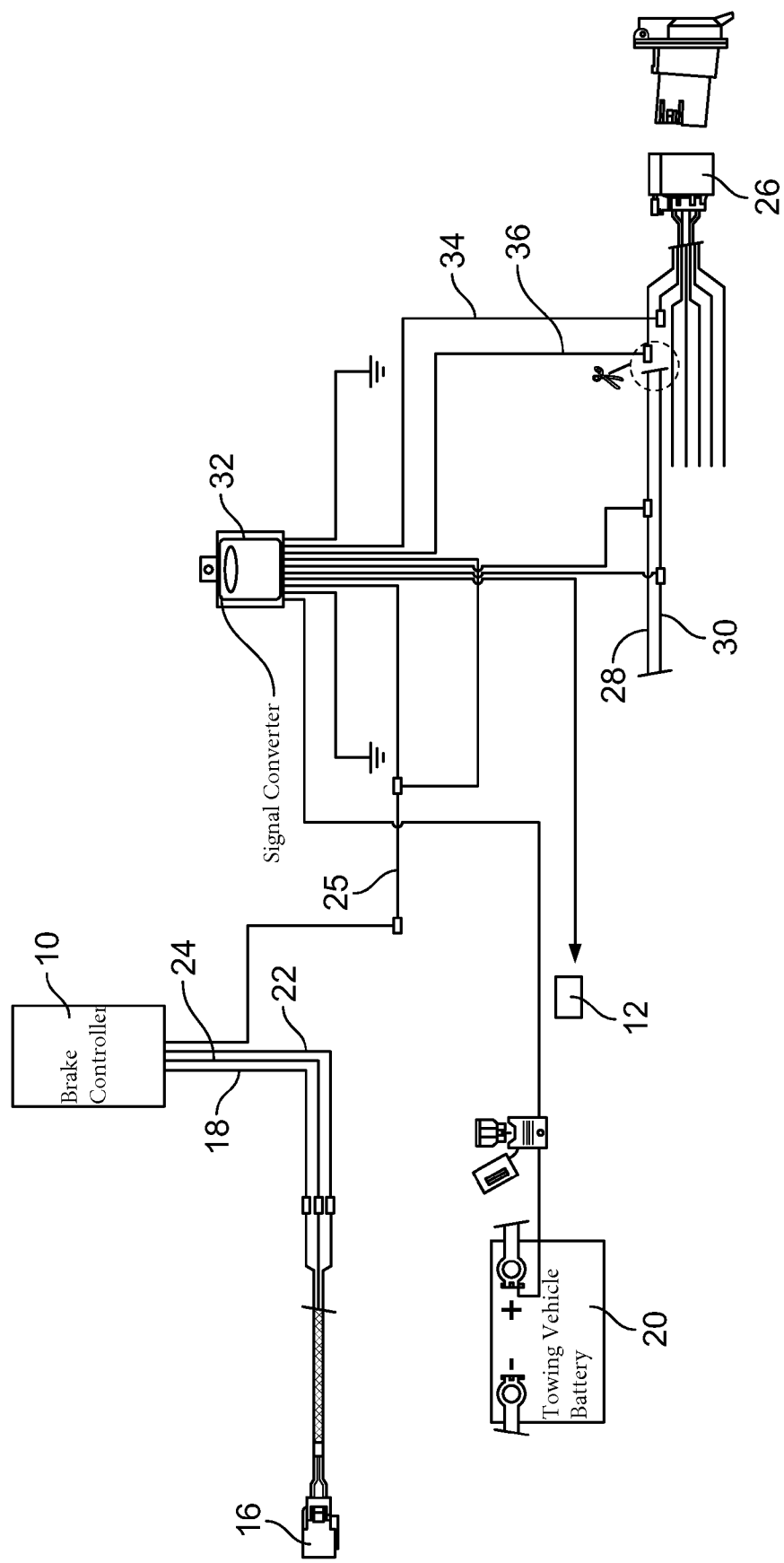
FIG. 2 illustrates a component diagram of a trailer brake and light signal system having a direct signal from the brake controller to the signal converter.

As shown in FIGS. 1 and 2, a system for controlling the brake and stop lights of a trailer vehicle is generally presented. The system may include various components, as described below. The components may be standard components on a towing vehicle, such as a truck or automobile, or after-market components configured to be integrated with the components of a towing vehicle.

The system includes a brake controller 10 configured to operate the brakes of a towed vehicle or trailer. The brake controller 10 may be an after-market brake controller 10 installed on the towing vehicle, or may be integrated with the braking system of a towing vehicle. Whether integrated or aftermarket, the brake controller 10 may provide a brake output signal to the brakes of the towed vehicle or trailer.

In an embodiment, the brake output signal may be a pulse-width modulated (PWM) signal sent to the trailer brakes. The trailer brakes may be electric brakes configured to receive a PWM signal. The PWM signal may vary in duty cycle depending on the braking power to be applied by the trailer brakes. For example, a signal with an increased duty cycle may provide increased braking power over a signal with a lesser duty cycle.

The brake controller 10 may be configured to receive a signal from a brake pedal 12 of the towing vehicle. Specifically, the brake controller 10 may receive a signal from a pedal position switch 14 located near the brake pedal. The pedal position switch 14 may output a signal when the pedal 12 is depressed to a preset distance. The signal may be a low voltage, low power signal.

The brake controller 10 may receive the input signal from the pedal position switch 14 and output the PWM brake output signal to the trailer brakes. The duty cycle of the PWM brake output signal may be based on any appropriate factors, such as acceleration, deceleration, speed, brake pedal position, or any other parameters.

The brake controller 10 may be connected to a brake control plug 16 on the towing vehicle. The brake control plug 16 may interface with the towing vehicle and include both inputs from the towing vehicle and outputs from the brake controller 10. As shown, the brake control plug 16 may provide a power input signal 18, such as a 12 volt signal, from the towing vehicle battery 20. The brake control plug 16 may also include a ground signal 22 and a brake output signal 24. The brake output signal 24 may be a discreet signal, such as a 12 volt signal, or a PWM signal.

The brake controller 10 may include a manual trailer brake activation, such as a button or lever. Engaging the button or lever may activate the trailer brakes without activating the towing vehicle brakes. When the manual brake button is pushed, the brake controller 10 may activate the brake output signal 24. The signal 24 may then be sent to the trailer to engage the trailer brakes, independent of any braking signal applied to the towing vehicle brakes.

The towing vehicle may include a braking signal connector, such as a 7-pin connector 26. The 7-pin connector 26 may include a plurality of wires to carry signals from the towing vehicle, including a right turn/stop output 28 and a left turn/stop output 30 from the vehicle. The towing vehicle may drive the right and left turn/stop output signals 28, 30 and therefore, these signals cannot be driven by the brake controller 10. Because the brake controller 10 no longer has access to directly drive the brake lamps on the towing or towed vehicle, an additional component may be required in order to initiate the trailer brake light in response to the manual brake activation.

In an embodiment, the towing vehicle may provide a right turn/stop light output 28 and a left turn/stop light output 30 to provide signals to a trailer with a 2-wire system with combined stop and turn lights. In an embodiment, the towing vehicle may provide a right turn light, left turn light, and stop light outputs to provide signals to a trailer with a 3-wire system having a separate stop and turn light on each tail light. For each configuration, the tail lights may require an additional component to initiate the appropriate lighting when the manual brake activation is applied.

In an embodiment, the system may include a signal converter 32. The signal converter 32 may be configured to receive inputs from both the vehicle and the brake controller 10 and drive the signal light outputs to the trailer. The signal converter 32 may be configured to receive inputs from both the vehicle and the brake controller and drive the right and left turn/stop output signals to trailers with a two-wire connection. Alternatively, the signal converter 32 may be configured to drive the separate turn and stop lights on a three-wire system. For example, the signal converter 32 may be configured to drive the stop lights while the right-turn and left-turn signals are passed through in the three-wire configuration, as further described below.

As shown in FIG. 1, the right and left turn/stop signals 28, 30 may be cut or spliced before they reach the 7-pin connector. The signal wires 28, 30 may then be connected and used as inputs to the signal converter 32. In an embodiment, the right and left turn/stop signals 28, 30 may pass through the converter instead of being cut or spliced.

In order to drive the trailer brake lights, the signal converter 32 must also receive a signal from the brake controller 10 indicating when the manual brake is activated. One solution is to run a wire from the brake controller 10, often located in the cab of the vehicle, to the signal converter 32, often located near the rear of the vehicle. Alternatively, the signal converter 32 may utilize the brake signal output 24 of the brake controller 10 as an input. For example, the signal converter may access the brake signal output 24 at the 7-pin connector 26. In an embodiment, the brake output signal wire 24 may be spliced to provide both a signal to the trailer brakes and an input to the signal converter 32 in response to activation of the brake controller manual brake.

The signal converter 32 may be configured to read and decode the PWM signal of the brake output signal 24. For example, the signal converter 32 may be programmed with preset duty cycle thresholds or ranges to determine when the PWM input signal is in a stop condition. In an embodiment, the signal converter 32 may be programmed to read a braking condition when the duty cycle of the brake output signal 24 is between 7% and 97%. However, it will be appreciated that the trailer signal converter 32 may apply any appropriate duty cycle threshold or range in determining a braking condition.

With reference to the circuit diagram in FIG. 1, the signal converter 32 may be configured to selectively output the right and left stop/turn output signals 34, 36, as required in a two-wire configuration. When only the right stop/turn signal 28 or only the left stop/turn signal 30 is on (such as flashing), and the manual brake is not activated, the signal converter 32 may act as a pass-through for the left and right stop/turn signals 28, 30 to turn on or flash the left and right stop/turn output signals 34, 36. When both of the left and right stop/turn signals 28, 30 are on, and the manual brake is not activated, the signal converter 32 may also act as a pass-through for the left and right stop/turn signals 28, 30.

When the manual brake is activated, the signal converter 32 receives a signal indicating that the manual brake is activated. The signal converter 32 will turn on the right and left stop/turn signals 28, 30 anytime the manual brake is activated unless one of the turn signals is engaged. If a turn signal is engaged, then the turn signal side will flash on both the vehicle and the trailer, while the opposite light will stay active only on the trailer.

When the brake control signal 24 is activated and both the right and left towing vehicle turn signals 28, 30 are on, trailer signal converter 32 may flash the left and right trailer vehicle turn lights. Alternatively, when the brake control signal 24 is activated and both the right and left towing vehicle turn signals 28, 30 are on, trailer signal converter 32 may hold the left and right trailer vehicle turn lights on.

Figure 3:
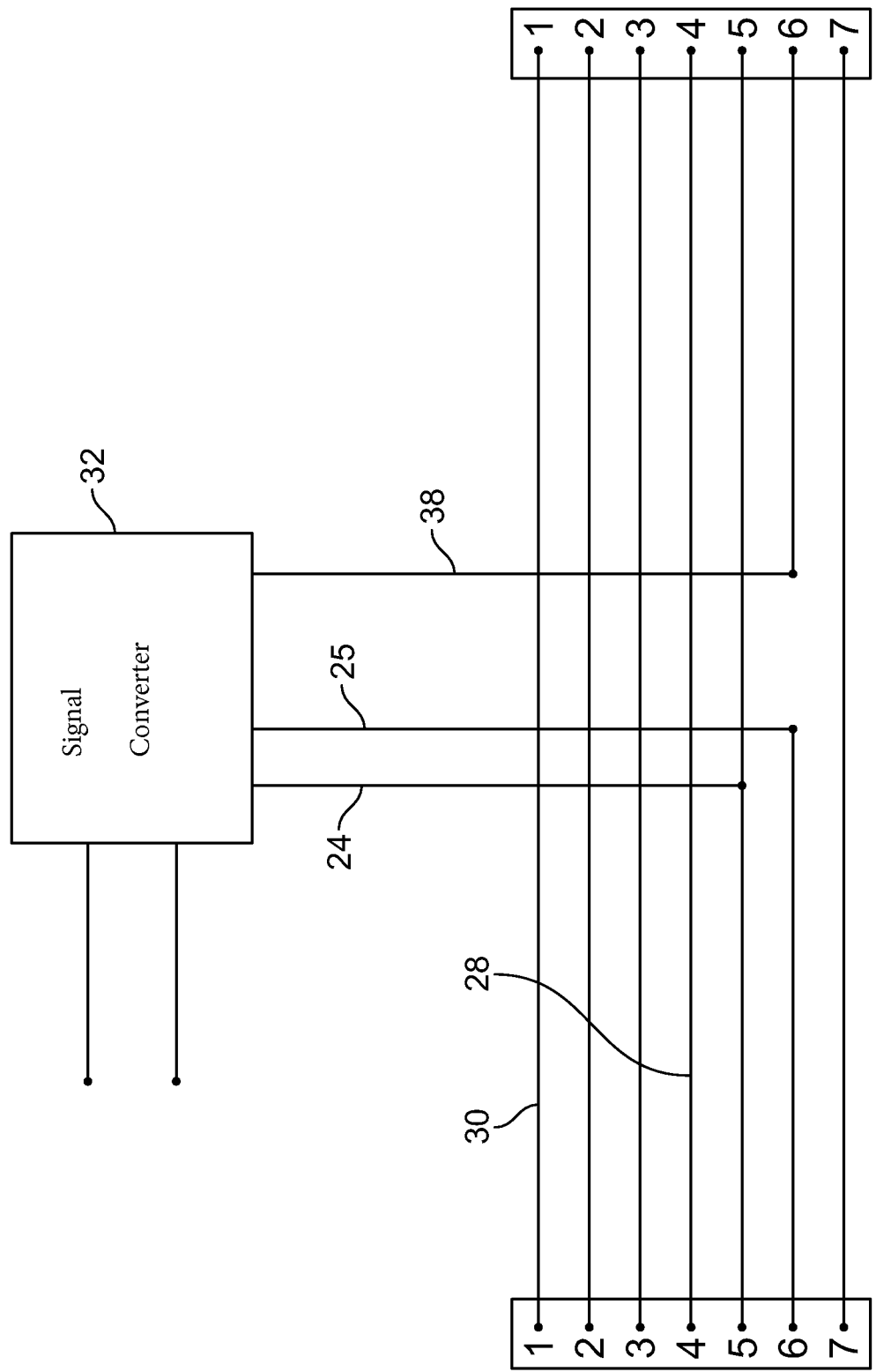
FIG. 3 illustrates a circuit diagram of trailer signal converter with a three-wire output scheme.

In an embodiment illustrated in FIG. 3, the signal converter 32 may be configured to interface with a three-wire system. For example, the signal converter 32 may be configured to drive a separate stop lights 38 in addition to the right and left turn signal lights 34, 36.

FIG. 3 illustrates a signal converter 32 having a plurality of inputs and a single output. The inputs may be received from the towing vehicle and output to the 7-pin connector 26 on the tow vehicle which connects to the trailer. The wires on the input side of the signal converter 32 may include the right and left tow vehicle turn signals 28, 30, the brake signal 24 and stop light 25, as well as a tail light signal, reverse signal, and a ground signal. While FIG. 3 illustrates only two wires connected as inputs to the signal converter 32, it will be appreciated that the signal converter 32 may be configured to receive any number of signals as inputs, or all the signals as inputs. The signal converter 32 may act as a pass through for any signals other than the inputs described below and may pass the signals onto the trailer. Further, the signal converter may act as a buffer for all the signals to provide over-current, shorting, and over-temperature protection.

In the three-wire system, the signal converter 32 may act as a pass through for the right vehicle turn signal 28 and left vehicle turn signal 30. In other words, anytime the right tow vehicle turn signal 28 is on the right trailer turn signal 34 will be on, and anytime the left tow vehicle turn signal 30 is on the left trailer turn signal 36 will be on. The right and left stop light signals 38, 40 will turn on anytime the brake signal 24 is on. Alternatively, as shown in FIG. 3, the right and left tow vehicle turn signals 28, 30 may run directly through the 7-pin connector 26 instead of inputs to the signal converter 32, as illustrated in FIG. 3.

The signal converter 32 may include two input signals, namely the trailer brake signal 24, and a stop light signal 25. As described above, the trailer brake signal may come from the trailer brake controller 10 and may be a PWM signal. The trailer signal converter 32 may apply a threshold or range to the PWM signal duty cycle to determine a braking condition, as explained above.

The stop light signal 25 may be tied to the towing vehicle brake light signal. The stop light signal 25 may turn on anytime the towing vehicle brakes are applied.

The signal converter 32 may drive the stop light signal 38 based the trailer brake signal 24 and tail light signal 25. When either the trailer brake signal 24 or stop light signal 25 are on, the signal converter may turn the stop light signal 38 on. Further, when both the trailer brake signal 24 and stop light signal 25 are on, the signal converter may turn the stop light signal 38 on.

The invention has been described above and modifications and alterations will occur to others upon a reading and understanding of this specification. The claims as follows are intended to include all modifications and alterations insofar as they come within the scope of the claims or the equivalent thereof.

Having thus described the invention, we claim:

1. A trailer signal converter comprising:
a plurality of input signals, including:
a first towing vehicle turn light signal;
a second towing vehicle turn light signal;
a trailer brake signal;
one or more output signals, including a first trailer vehicle turn light signal output and a second trailer vehicle turn light signal output;
wherein the trailer signal converter is configured to turn on both first and second trailer vehicle turn lights when both the first and second towing vehicle turn light signals are on and the trailer brake signal is off, or when the trailer brake signal is on and both the first and second towing vehicle turn light signals are off; and
wherein the trailer signal converter is configured to flash the first trailer vehicle turn light and turn on the second trailer vehicle turn light when the trailer brake signal is on and the first towing vehicle turn light signal is flashing and the second towing vehicle turn light signal is off.

2. The trailer signal converter of claim 1, wherein the first towing vehicle turn light signal is the left towing vehicle turn light signal and the first trailer vehicle turn light signal is the left trailer vehicle turn light signal.

3. The trailer signal converter of claim 1, wherein the second towing vehicle turn light signal is the right towing vehicle turn light signal and the second trailer vehicle turn light signal is the right trailer vehicle turn light signal.

4. The trailer signal converter of claim 1, wherein the trailer brake signal is an output signal from a trailer brake controller.

5. The trailer signal converter of claim 1, wherein a brake output signal is generated in response to activation of a manual control.

6. The trailer signal converter of claim 1, wherein an output signal from a trailer brake controller is a pulse-width-modulated (PWM) signal.

7. The trailer signal converter of claim 1, wherein a trailer signal converter is configured to decode the PWM signal.

8. The trailer signal converter of claim 7, wherein the trailer signal converter is configured to determine a braking condition when the PWM signal duty cycle is between 7% and 97%.

9. The trailer signal converter of claim 1, wherein the trailer signal converter is configured to turn on the first trailer vehicle turn light when the first towing vehicle turn light signal is on and the second towing vehicle turn light signal and trailer brake signal are both off.

10. The trailer signal converter of claim 1, wherein the trailer signal converter is configured to flash the first and second trailer vehicle turn lights when the first and second towing vehicle turn light signals are flashing and the trailer brake signal is on or off.

11. The trailer signal converter of claim 1, wherein the trailer signal converter is configured to turn on the first and second trailer vehicle turn lights when the first and second towing vehicle turn light signals are flashing and the trailer brake signal is on.

12. A trailer signal converter comprising:
a plurality of input signals, including a trailer brake signal input and a brake light signal input;
a stop light output signal;

wherein the trailer signal converter is configured to turn on the stop light output signal when the trailer brake signal input or the brake light signal input is on, or when both the trailer brake signal input and the brake light signal input are on.

13. The trailer signal converter of claim 12, wherein the trailer brake signal input is a pulse-width-modulated (PWM) signal.

14. The trailer signal converter of claim 13, wherein the trailer signal converter is configured to decode the PWM signal.

15. The trailer signal converter of claim 13, wherein the trailer signal converter is configured to determine a braking condition when the PWM signal duty cycle is between 7% and 97%.

16. The trailer signal converter of claim 13, wherein the trailer brake signal input is an output from a trailer brake controller.

17. The trailer signal converter of claim 13, wherein the trailer brake signal input is generated in response to activation of a manual brake control.

\* \* \* \* \*